United States Patent Office 3,319,732
Patented May 16, 1967

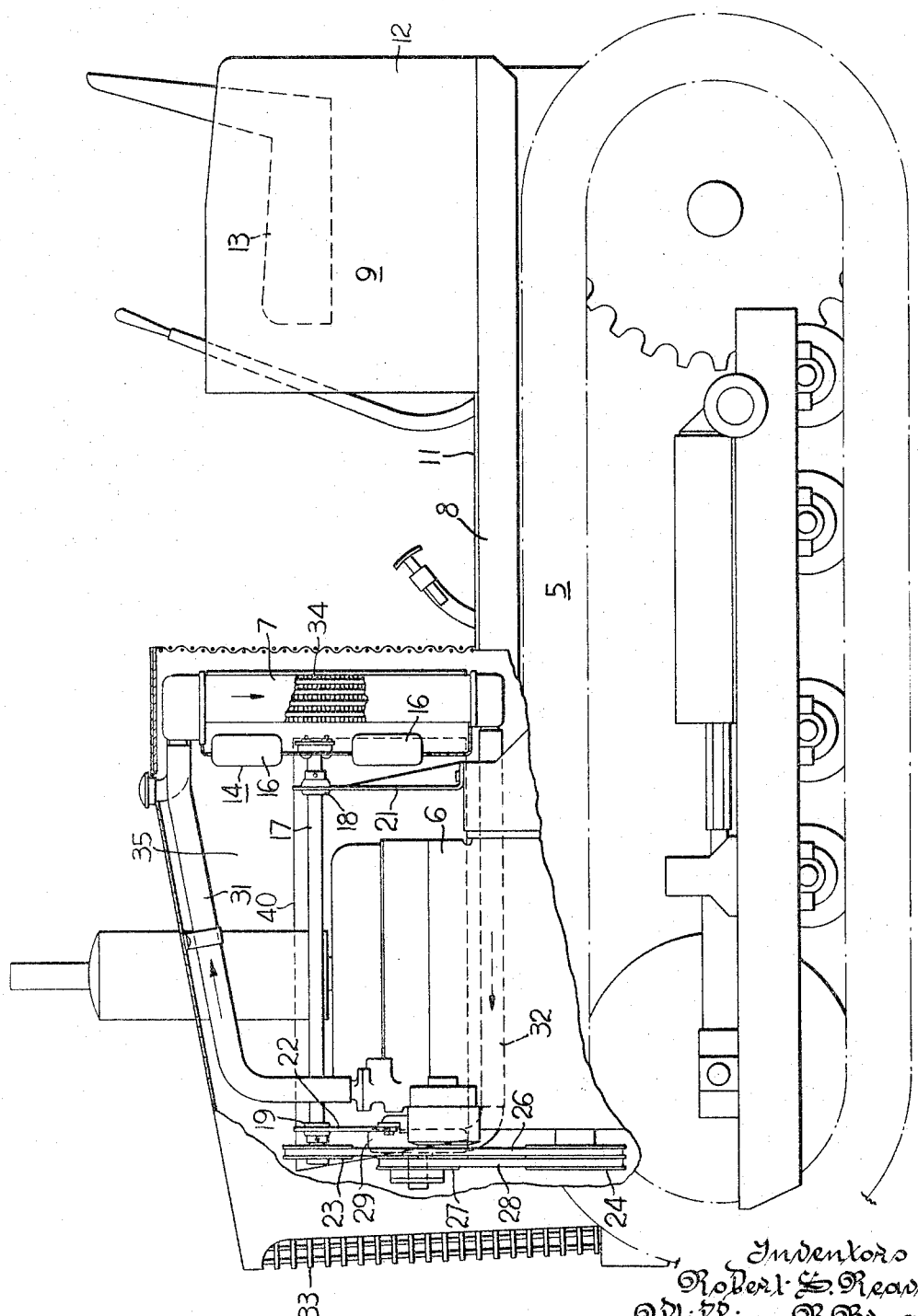

3,319,732
ENGINE COOLING SYSTEM FOR TRACTORS (RADIATOR AND FAN LOCATED BETWEEN ENGINE AND OPERATOR)
Ronald J. Soeteber, New Berlin, Robert S. Reaves, Waukesha, and William R. Bryant, West Allis, Wis., assignors to Allis-Chalmers Manufacturing Company, Milwaukee, Wis.
Filed Feb. 12, 1965, Ser. No. 432,188
1 Claim. (Cl. 180—54)

This invention relates generally to engine cooling systems and more particularly to an improved arrangement for supplying engine cooling air for the operation of tractors or other mobile equipment.

Tractors and other similar equipment usually water cool their engines by circulating engine heated water through a radiator. Conventionally, an engine driven fan is used to pass cooling air through a forwardly mounted radiator, and at times to blow the air back across the engine block. Unfortunately, with the radiator in this forward position it is subject to damage, particularly when the tractor is of the crawler type which is often use for pushing loads. In the removal of woodland undergrowth, etc., small bits of dirt, leaves, wood and plants etc., may be carried by the cooling air or forced into the forward portion of the tractor to clog the air passages of the radiator thereby causing overheating problems. When a suction type fan is used the heated air blowing back across the engine with its entrained dust and the like is directed at the operator causing great discomfort.

The present invention provides a cooling system which avoids the foregoing problems by providing a radiator located between the engine and the operator wherein the radiator is not only protected but the air is moved forwardly from around the operator, through the air passages in the radiator and forwardly over the engine, thus keeping the operator comfortable and the radiator air passages more free of debris.

A further object of this invention is to provide an engine cooling system for a tractor wherein the radiator is positioned in a protected position and the tractor engine may be further protected by side sheets without detracting from the cooling efficiency thereof and yet providing additional comfort for the operator.

The foregoing along with additional objects and advantages will be apparent from the following description of a specific embodiment of the invention as depicted in the accompanying drawing in which:

The drawing is a side elevation of a crawler tractor embodying the invention, some portions of the tractor have been removed to better illustrate the invention.

Referring now to the drawing, a tractor 5 has a conventional water-cooled internal combustion engine 6. The water coolant is circulated through the radiator 7 mounted by conventional means on longitudinally extending main frame 8 at a midportion thereof. Engine 6 is also mounted on main frame 8 at a forward portion thereof by conventional means. At the rear end of frame 8, an operator's platform or station 9 is provided. This station includes a floor portion 11 attached to frame 8, transversely spaced side members 12 carried by frame 8 and adapted to support operator's seat 13. Positioned forwardly of radiator 7 is a suction fan 14 including blades 16 attached to the rearward end of shaft 17. Shaft 17 is journaled in rear bearing 18 and front bearing 19. Rear bearing 18 is supported by bracket 21 which is attached to frame 8 by conventional means. Front bearing is supported by bracket 22 which is attached to a portion of engine 6.

The forward end of shaft 17 has attached thereto a pulley 23 which is driven by the rear pulley of compound pulley 24 through the medium of drive belt 26. Pulley 24 is attached to the front end of the drive shaft of engine 6. The front pulley of compound pulley 24 is drivingly connected to water pump pulley 27 by means of belt 28 for operating water pump 29.

The path of circulation of water through the cooling system is conventional as shown by arrows. Hot water moves out of the top of engine 6 and through tube 31 and enters the top of radiator 7. The water then descends through the tubes in radiator 7. The water is then returned from the bottom of radiator 7 to pump 29 by means of tube 32. Pump 29 forces the water through the water passages of engine 6 to tube 31.

Fan 14 is ordinarily given a direction of rotation to draw air from a vicinity of the operator's station 9 through longitudinally extending air passageways 34 in radiator 7 and blows such air over engine 6. It is therefore seen that the air taken into the air passageways should be cleaner than air taken in at the front end of a conventional tractor and furthermore such air provides cooling not only for the radiator, engine coolant and engine in turn but also provides cooling for the operator who normally would be stationed on platform 9 in seat 13 or standing on floor 11. The forward end of tractor 5 is provided with grillwork 33 to provide a primary exit for the hot air passing forwardly over the engine. The normally open sides of engine compartment 35 provide secondary exits for the hot air passing forwardly. Provision is made to close these secondary exits through addition of protective side sheets 40, which when applied cause all air to pass through the front grille. Addition of side sheets has no detrimental effect on cooling, and such sheets do provide valuable protection for the engine.

If desired reversing mechanism or fan providing reverse flow could be provided at 14 so that it could be operated to blow air rearwardly through radiator 7 towards the operator's station. Such operation might be desired in extremely cold weather particularly when the tractor was stationary but had its engine operating. This reverse flow of air would prove beneficial in maintaining the air passageways in radiator 7 free of foreign material. Such fan reversing mechanism has not been shown in the drawings as fan reversing mechanisms are conventional.

In this invention we have shown only the preferred embodiment of this invention simply by way of illustrating the preferred mode of carrying out the invention as by law required. However, the broad inventive concept is capable of embodiment in other and different forms without departing from our invention. Accordingly, the drawings and description are to be construed as merely illustrative and not exclusive.

The embodiments of the invention for which an exclusive property or privilege is claimed are defined as follows:

In combination, a crawler tractor having a longitudinally extending main frame, an engine mounted on the forward end of said frame, an operator's station mounted on a portion of said frame rearwardly of said engine, a radiator having longitudinal extending air passages therein and being operatively connected to said engine and being mounted on said frame longitudinally between said operator's station and said engine, an open grille mounted on said frame forwardly of said engine and a suction fan operatively connected to said engine and mounted on said frame longitudinally between said engine and said radiator to move air longitudinally from said operator's station, through said radiator air passages, over said engine and through said grille for cooling said engine, and said engine being mounted on said frame in a compartment having said grille at the forward end thereof and said compartment having removable side sheets for selectively providing a secondary exit for hot air passing forwardly.

References Cited by the Examiner

UNITED STATES PATENTS

| | | |
|---|---|---|
| 1,081,023 | 12/1913 | Defevre et al. |
| 1,126,960 | 2/1915 | Day _____ 180—64 |
| 1,964,779 | 7/1934 | Ziegler _____ 180—9.24 X |
| 2,788,775 | 4/1957 | Steiner. |
| 3,043,390 | 7/1962 | Lattay. |
| 3,112,002 | 11/1963 | Van der Lely. |

FOREIGN PATENTS

| | | |
|---|---|---|
| 737,700 | 7/1943 | Germany. |
| 354,424 | 8/1931 | Great Britain. |

BENJAMIN HERSH, *Primary Examiner.*

M. L. SMITH, *Assistant Examiner.*